United States Patent [19]

Miyadera et al.

[11] Patent Number: 4,769,770
[45] Date of Patent: Sep. 6, 1988

[54] ADDRESS CONVERSION FOR A MULTIPROCESSOR SYSTEM HAVING SCALAR AND VECTOR PROCESSORS

[75] Inventors: Hiroo Miyadera, Atsugi; Shun Kawabe, Machida; Hiroshi Murayama; Yasuhiko Hatakeyama, both of Hadano, all of Japan

[73] Assignee: Hitachi, Ltd., Tokyo, Japan

[21] Appl. No.: 807,684

[22] Filed: Dec. 11, 1985

[30] Foreign Application Priority Data

Dec. 14, 1984 [JP] Japan .................... 59-264071

[51] Int. Cl.$^4$ .................... G06F 9/36; G06F 9/00
[52] U.S. Cl. .................... 364/200
[58] Field of Search ... 364/200 MS File, 900 MS File

[56] References Cited

U.S. PATENT DOCUMENTS

| | | | |
|---|---|---|---|
| 3,569,938 | 3/1971 | Eden et al. | 364/200 |
| 3,693,165 | 9/1972 | Reiley et al. | 364/200 |
| 3,723,976 | 3/1973 | Alvarez et al. | 364/200 |
| 3,764,996 | 10/1973 | Ross | 364/200 |
| 3,825,904 | 7/1974 | Burk et al. | 364/200 |
| 3,902,164 | 8/1975 | Kelley et al. | 364/200 |
| 3,970,999 | 7/1976 | Elward | 364/200 |
| 4,057,848 | 11/1977 | Hayashi | 364/200 |
| 4,068,303 | 1/1978 | Morita | 364/200 |
| 4,170,039 | 10/1979 | Beacom et al. | 364/200 |
| 4,241,401 | 12/1980 | De Ward et al. | 364/200 |
| 4,326,248 | 4/1982 | Hinai et al. | 364/200 |
| 4,373,179 | 2/1983 | Katsumata | 364/200 |
| 4,376,297 | 3/1983 | Anderson et al. | 364/200 |
| 4,456,954 | 6/1984 | Bullions, III et al. | 364/200 |
| 4,482,952 | 11/1984 | Akagi | 364/200 |
| 4,521,846 | 6/1985 | Scalzi et al. | 364/200 |
| 4,628,451 | 9/1986 | Sawada et al. | 364/200 |
| 4,641,277 | 2/1987 | Yata et al. | 364/900 |
| 4,654,777 | 3/1987 | Nakamura | 364/200 |
| 4,700,291 | 10/1987 | Saito | 364/200 |

Primary Examiner—Archie E. Williams, Jr.
Assistant Examiner—Danh T. Phung
Attorney, Agent, or Firm—Antonelli, Terry & Wands

[57] ABSTRACT

An information processing apparatus having an address translation system includes a plurality of processors in each of which an addressing is carried out by translating a logical address into a real address in the virtual storage system for data processing. The plurality of processors include a scalar processor for translating a logical address into a real address by using an address translation table; and a vector processor for determining if the logical address to be relocated lies within a predetermined address range, for address-relocating the logical address to the real address based on a relocation table when the logical address lies within the predetermined address range, and using the logical address as a real address when the logical address lies outside of the predetermined address range. The predetermined address range and the content of the relocation table are set by the scalar processor which supervises the program storage area.

4 Claims, 6 Drawing Sheets

ADDRESS CONVERSION FOR A MULTIPROCESSOR SYSTEM HAVING SCALAR AND VECTOR PROCESSORS

BACKGROUND OF THE INVENTION

1. Field of the Invention

The present invention relates to an information processing apparatus having a plurality of processors employing a virtual storage system for translating a logical address specified in a program into a real address, and more particularly to an address translation system in such a virtual storage system.

2. Description of the Related Art

Large scale and high speed computers are needed more and more in the engineering and scientific field. Advances in semiconductor integration technique is remarkable. With the aid of the recent hardware technique, computers for exclusive use in engineering and scientific computing aiming at a high speed arithmetic operation and having a large capacity of memory are being manufactured.

The computers for exclusive use in engineering and scientific computing of this type are generally constructed of a vector processing unit (vector processor) exclusively conducting vector operations, an operating system for management of all of the computer resources, and a scalar processing unit (scalar processor) conducting those parts of the engineering and scientific computing which cannot be developed into vector instructions.

In case the computers constructed as above for exclusive use in engineering and scientific computing adopt a virtual storage system, the vector and scalar processors mutually and efficiently execute the engineering and scientific computing program in the logical address space. With the advent of large scaled engineering and scientific computing programs, the logical address space has expanded from conventional 16 MB (Mega Byte) to 2 GB (Giga Byte) and the capacity of the real memory is about 256 MB.

The greater part of the engineering and scientific computing program is often occupied by specific data such as matrix data, as different from the conventional program. It can be considered more efficient to process the program with such specific data in a special way (such as with an address translation method). The data area has in general the following features.

(1) The reference/updating of data in the data area is performed in a concentrated manner for a certain period while the whole program is running.

(2) It is also desirable that interruption of processing (such as a page fault) is to be avoided during the reference/updating operation.

It is efficient not to use the data area as an object of paging for transferring data in units of pages between the main storage and the external storage (i.e., page fixation) and to process the data by a so-called swap-in/out system which makes all of the data reside in the main storage when they are requested and makes all of the data expel out into the external storage when they are not requested.

The scalar processor deals with such a program in a way that pages are fixed, and the access to memory is performed through address translation using conventional segment/page tables and translating a logical address, i.e., the address used in programming, into a real address, i.e., the address allocated in the real storage. Although the tables reside in the main storage, it is common that translation pairs of the logical addresses and real addresses are in part stored in a high speed memory (TLB: Translation Look-aside Buffer) in order to ensure high speed addressing. In contrast, it is necessary for the vector processor to be operated at a high speed. Therefore, in performing the address translation it is necessary to have a high speed translation table (TLB) for all of the areas to be accessed. If the vector processor requires the high speed translation table for all of the table entries, it is difficult to realize the processor because of the large capacity even if current semiconductor integration technique is utilized One of the countermeasures is to load the program in the main storage with the logical addresses and real addresses coinciding with each other and to perform the operation. Although the address translation table for the vector processor is not needed, there arises a problem that the utilization of the main storage becomes degraded. In particular, with the above countermeasure, it is necessary for the program to occupy the contiguous areas in the main storage. However, after repeated feeding and releasing of the program, the unoccupied areas occur in the main storage in a fragmentary way (fragmentation). Although the sum of the fragmentary portions is satisfactory, the portions are not contiguous relative to each other so that it becomes necessary for execution of a job to wait until a certain continuous unoccupied area become available.

A known document relevant to the present invention is for example the Official Gazette of Japanese patent unexamined publication No. 58-97184 which however does not take into consideration to solve the above problems.

SUMMARY OF THE INVENTION

It is an object of the invention to provide an information processing apparatus capable of effectively utilizing the real address space/logical address space made of the proper amount of semiconductors while retaining the high performance of the vector processor.

The information processing apparatus according to the present invention includes a plurality of processors performing addressing by translating a logical address into a real address in the virtual storage system. Of the processors, the scalar processor is provided with an address translation table and translates a logical address into a real address by using the address translation table. The vector processor is provided with a relocation table and determines if the logical address is present within a predetermined address range. If the logical address is present within the predetermined address range, the logical address is address-relocated to the real address by using the relocation table, while if the logical address is present outside of the predetermined address range, the logical address is used as the real address. The contents of the relocation table and the address range in the vector processor is supervised by the scalar processor in such a way that the address translation table and the relocation table does not contradict each other.

The address translation conducted by the scalar processor is the same as the conventional system. The conventional address translation system generally adopts a system using the segment table and the page table. With this system, the logical address is divided into upper, middle and lower three address portions. By using the upper address, the segment table is addressed to take out a first entry. By using the first entry and the middle address, the page table is addressed to take out a second entry. The real address is obtained by adding the second entry and the lower address. If, for example, plural engineering and scientific computing programs are processed in parallel under the address translation system by using the segment table and the page table, one logical address space is assigned to each of the engineering and scientific computing programs, and a segment table is provided for each of the logical addresses respectively. But with respect to the page tables, it is possible to make the structure of the page tables such that the page tables are provided only for the address range which is actually necessary for the program, to thereby reduce the amount of the page tables to the minimum. Also, for example, for the program which is used in common by the spaces, such as the operating system, it is possible to address a common page table from each of the segment tables, and carry out processing as to the common region in multiplex spaces with ease. As stated above, the address translation system is versatile in identifying the address and has the above-noted advantages. Thus, the scalar processor adopts the address translation system.

Also in the vector processor, the address translation system is ideally adopted in view of the versatile nature in identifying the address. With the address translation system using the segment table and the page table, however, the table must be looked up two times, which spends time. This raises an obstacle to the vector processor which must operate at a high speed. Alternatively, if high speed address translation is intended by using TLBs, the quantity of TLBs becomes extremely large. Therefore, paying attention to the fact that the programs executed by the vector processor are limited as is different from the scalar processor conducting supervision of the whole computer, address relocation has been adopted in the vector processor for performing high speed address translation. In address relocation, the logical address is divided into the upper and lower portions. If the upper address is present within a predetermined address range to be relocated, the relocation table is looked up by a predetermined address portion of the upper address to read an entry. The real address is obtained by adding the entry and the lower address. With the address relocation, the address range capable of being identified by the lower address is simply relocated by changing the upper address. Therefore, the versatile nature in identifying the address, as of the address translation system using the segment table and the page table, is not ensured. The relocation table must cover all of the address identification areas, corresponding to the number of relocation-table-address identifying bits of the upper address. Since the relocation table must cover even those addresses not actually used, the capacity of the table becomes uneconomical as compared with the in the address translation system. However, with the address relocation system, the reference to the table is only once so that address translation is carried out at a high speed. Since the programs executed by the vector processor are limited, the relocation table suffices only if it covers the limited programs without covering all of the programs. Thus, wastage of the table due to the unoccupied domains in the relocation table, can be avoided.

According to the present invention, address translation from the logical address to the real address can be performed at a high speed by use of the address relocation by the vector processor, which leads to a high performance of the vector processor. Translation from the logical address to the real address prevents occurrence of the fragmentary domain in the main storage as compared to the when not performing the translation. Thus, an effective utilization of the real address space (main storage)/logical address space is ensured. The system can be realized without use of a large amount of TLBs and with an optimized semiconductor amount.

BRIEF DESCRIPTION OF THE DRAWINGS

These and other objects of the present invention will become apparent by reference to the following description and accompanying drawings wherein.

DESCRIPTION OF THE PREFERRED EMBODIMENTS

Figure 1:
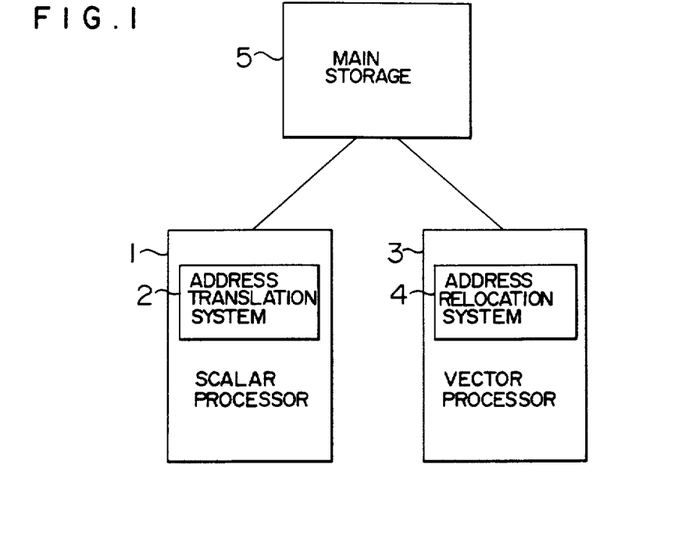
FIG. 1 shows one example of the system arrangement of the information processing apparatus according to the present invention.

FIG. 1 is a block diagram showing the overall arrangement of the information processing apparatus according to an embodiment of the present invention. In the figure, a scalar processor 1 makes access to a main storage (MS) through an address translation system 2, while a vector processor 3 makes access to the main storage 5 through an address relocation system 4.

Figure 2:
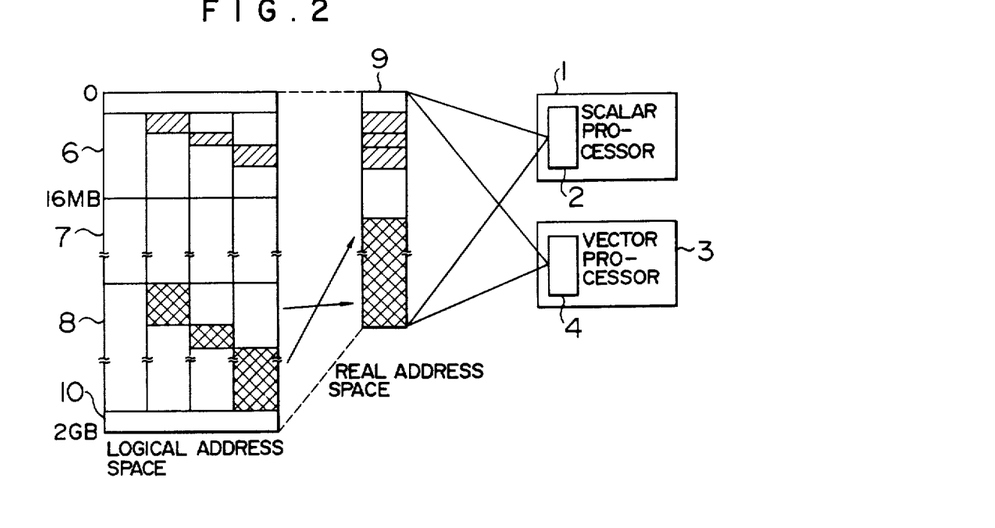
FIG. 2, is a diagram showing the relationship between the logical address and the real address wherein the programs residing in the different program spaces are allocated to the different logical addresses.
Figure 3:
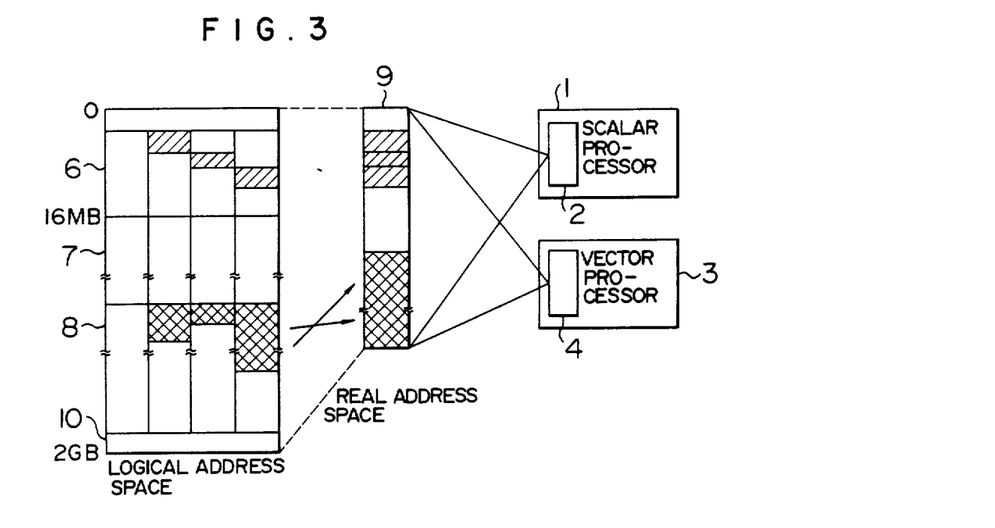
FIG. 3, is a diagram showing the relationship between the logical address and the real address wherein the programs residing in the different program spaces are allocated to the same logical address.

FIGS. 2 and 3 show examples of the program arrangement in the logical address space and the program arrangement in the real address space after the address translation.

The logical address space shown in FIG. 2 is mainly divided into an area 6 lower than 16 MB, areas 7 and 10 higher than 16 MB which the scalar processor 1 uses, and an area 8 higher than 16 MB which the vector processor 3 and the scalar processor 1 use. Three engineering and scientific computing programs are allocated in the domains indicated by oblique lines in the respective address spaces. In FIG. 2, the programs are characterized in that the addresses of the programs in the logical address space are different from each other, which simplifies the supervision of the relocation table. The real address spaces 9 of the programs are accessed by the scalar processor 1 after they are subjected to address translation under the address translation system 2, while the real address spaces 9 are accessed by the vector processor 3 after they are subjected to address translation under the address relocation system 4.

In FIG. 3, the program allocation to the expanded area 8 in the logical address space differs from that of FIG. 2. The programs allocated at different in the 5 spaces are allocated in the same address.

In FIGS. 2 and 3, the instructions and data of the engineering and scientific computing program are allocated to the expanded area 8. In the allocation of FIG. 2, fragmentation is not present in the real address space, but is present in the logical address space. In the allocation to the expanded area 8 as shown in FIG. 3, fragmentation in the logical space also is not present so that more efficient allocation of the areas is possible. However, on the other hand, supervision of the relocation table becomes complicated as compared with the space allocation shown in FIG. 2.

Figure 4:
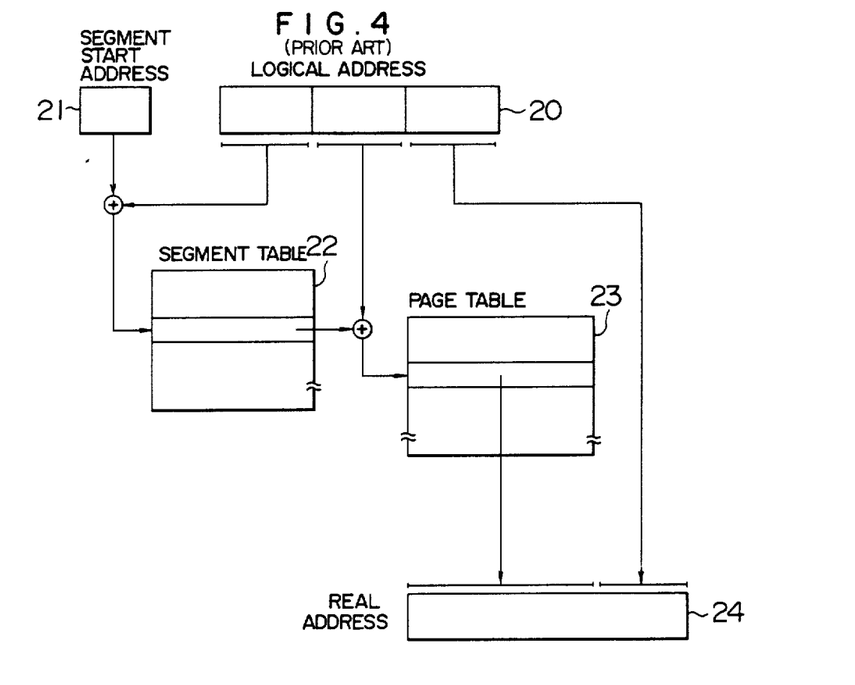
FIG. 4 is a diagram showing the address translation in the scalar processor.

FIG. 4 illustrates the translation method of the scalar processor 1 for translating the program in the logical address space into the real address space by means of the address translation system 2. This translation is well known in the art and will be explained briefly. By adding the upper address of the logical address 20 and the segment start address 21, an entry in the segment table 22 is taken out. By adding the entry and the middle address of the logical address 20, an entry in the page table 23 is taken out and is used as the upper address of the real address. As the lower address of the real address, the lower address of the logical address 20 is used. In case a plurality of engineering and scientific computing programs are processed, the segment table is provided for each of the program spaces respectively and a desired page table can be taken out from the page address obtained by adding the entry from the segment table and the middle address. The segment table 22 and the page table 23 are provided on the main storage. However, to speed up the address translation, the address translation system 2 is generally provided with a high speed translation table (TLB) storing part of translation pairs of the real addresses and corresponding logical addresses.

Figure 5:
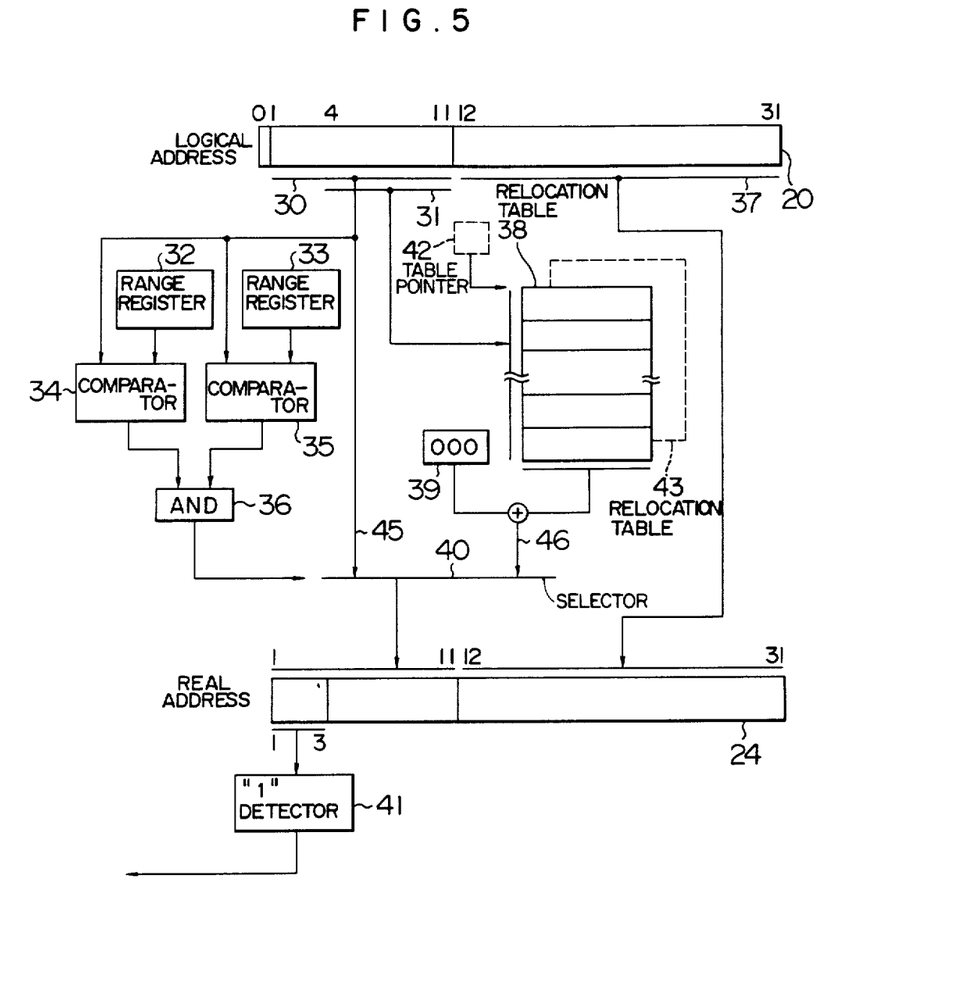
FIG. 5 is a block diagram showing an embodiment of the address relocation system in the vector processor according to the present invention.

FIG. 5 shows an example of the translation system wherein the vector processor 3 translates the program in the logical address space into the real address space by means of the address relocation system 4. In this embodiment, the capacity of the relocation table 38 is 1 MB. Range registers 32 and 33 stores the upper and lower limits of the logical addresses to be relocated, the limits being set beforehand by the scalar processor 1. The capacity of the main storage 5 is 256 MB. The operation will be described more concretely hereinbelow.

An entry in the relocation table (in this embodiment, there are 256 entries) is selected by the value of bits 4 to 11 of the logical address. Three zero bits 39 are annexed to the head of the entry. By changing the contents of the upper bits 1 to 11 of the logical address 20, the address range to be determined by the number of lower bits 12 to 31 of the logical address 20 is relocated. The entry annexed with three upper zero bits is transferred via a data line 46 to a selector 40. The bits 1 to 11 of the logical address 20 are directly transferred to the selector 40 and comparators 34 and 35 where they are compared with the contents of the range registers 32 and 33 to check if they are included within the range to be relocated. The results are transferred via an AND gate 36 to the selector 40 to select one of the data lines 45 and 46. That is, the data line 46 is selected when the contents are within the range to be relocated, while the data line 45 is selected when the contents are outside of the range to be relocated. The output of the selector 40 is set at the bits 1 to 11 of the real address 24. The bits 12 to 31 of the logical address 20 are directly set at the bits 12 to 31 of the real address 24. The real address 24 is accordingly outputted from the address relocation system 4 and is used for access to the main storage 5. Since the capacity of the main storage 5 is 256 MB, if a "1" detector 41 detects "1" in the bits 1 to 3 of the real address 24, it outputs an address error signal.

To implement the system of the logical address space arrangement of FIG. 2 by using the hardware constructed as above, the upper/lower limit of the relocation range (expanded area 8) is first set at the registers 32 and 33 at the time of the system set-up. Thereafter, at the start of each engineering and scientific computing job, the addresses are set at the corresponding entries of the relocation table 38. The setting of the upper/lower limit and addresses of the relocation table 38 are performed by the scalar processor. Since the engineering and scientific computing jobs in the area lower than 16 MB are outside of the relocation range, the data line 45 is selected. The operating system (under control of the scalar processor) supervises in such a way that the address translation table of FIG. 4 and the relocation table 38 of FIG. 5 does not contradict each other.

To implement the system of the logical address space arrangement of FIG. 3 by using the hardware constructed as above, the upper/lower limit of the relocation range is first set at the registers 32 and 33 at the time of the system set-up. Thereafter, at the start of an engineering and scientific computing job, the addresses are set at the corresponding entries of the relocation table 38. When another job starts, it is necessary to renew, every time the space is changed, the contents of the relocation table entries so as to match with the job. In order to reduce an overhead during changing the space, a plurality of relocation tables may be provided. In this case, the content corresponding to each job is written in each of the relocation tables, and pointers are provided for identifying the relocation tables. Thus, the relocation tables are selected in a software fashion by using the content of the pointer. Such a hardware is shown in FIG. 5 by broken lines, where reference numeral 42 represents a pointer and reference numeral 43 represents another relocation table.

The address translation conducted by the scalar and vector processors is summed up as shown in Table 1.

TABLE 1

| LOGICAL ADDRESS | SCALAR PROCESSOR | VECTOR PROCESSOR |
| --- | --- | --- |
| 0 ~ (Lower Limit Address −1) | AT ($A_L$) | $A_L$ |
| Lower Limit Address ~ Upper Limit Address | AT ($A_L$) | RT ($A_L$) |
| (Upper Limit Address +1) ~ 2GB | AT ($A_L$) | $A_L$ | where $A_L$ represents a logical address, AT ($A_L$) means to translate the logical address by means of the address translation system, and RT ($A_L$) means to translate the logical address by means of the address relocation system.

Figure 6:
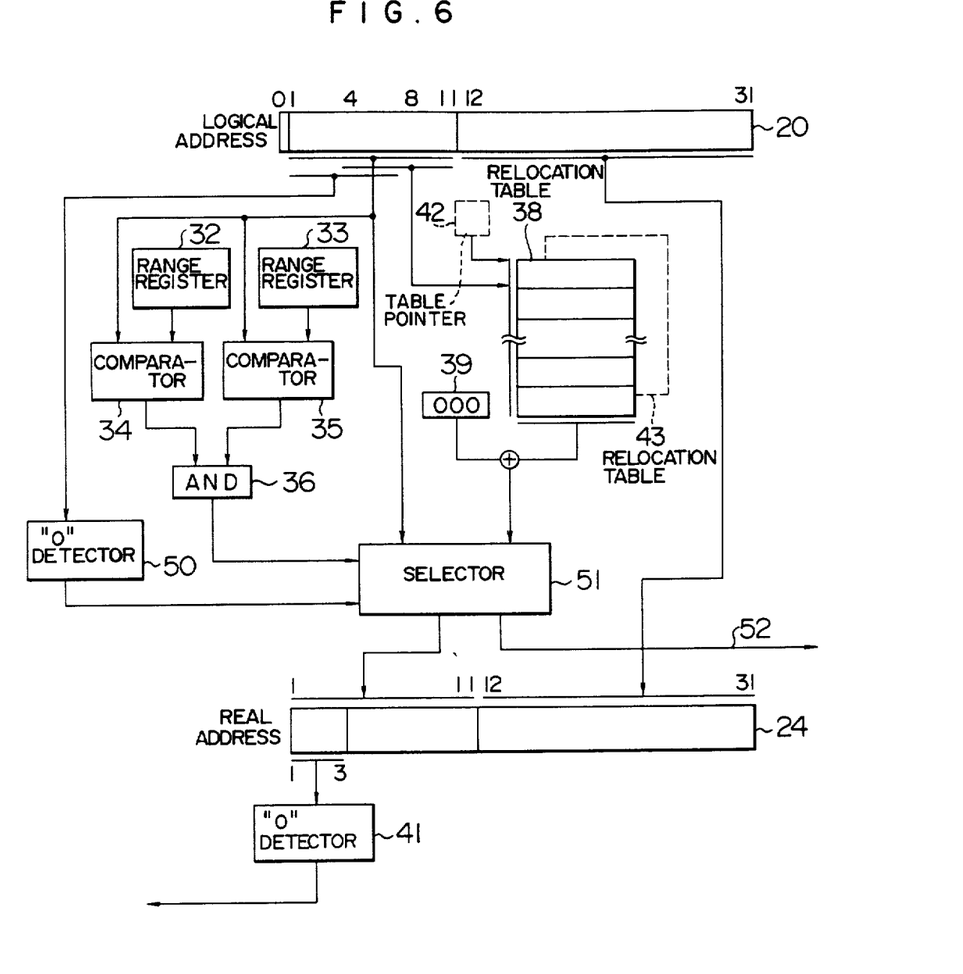
FIG. 6 is a block diagram showing another embodiment of the address relocation arrangement in the vector processor according to the present invention.

FIG. 6 shows a block diagram wherein a "0" detector 50, selector 51 and error signal 52 are added to the circuit of FIG. 5. The "0" detector 50 detects if all of the bits 1 to 7 of the logical address 20 are zero. In case of all zeros, it outputs a "0" detection signal to the selector 51. Upon reception of the "0" detection signal from the "0" detector 50 and a signal from the AND gate 36 indicating the outside of the relocation range, the selector 51 selects the bits 1 to 11 of the logical address 20. If the selector 51 does not receive the "0" detection signal from the "0" detector 51 but receives the signal from the AND gate 36 indicating the outside of the relocation range, then it outputs an error signal 52. Whereas if the selector 51 does not receive the "0" detection signal from the "0" detector 51 but receives a signal from the AND gate 36 indicating the inside of the relocation range, then it sets at the bits 1 to 11 of the real address the entry of the relocation table 43 annexed with upper three zero bits 39. The scalar and vector processors operate as shown in Table 2. The meanings of $A_L$, AT $(A_L)$ and RT $(A_L)$ are the same with Table 1.

TABLE 2

| LOGICAL ADDRESS | SCALAR PROCESSOR | VECTOR PROCESSOR |
|---|---|---|
| 0 ~ 16 MB | AT $(A_L)$ | $A_L$ |
| (16MB +1) ~ (Lower Limit Address) | AT $(A_L)$ | Error |
| Lower Limit Address ~ Upper Limit Address | AT $(A_L)$ | RT $(A_L)$ |
| Upper Limit Address + 1 ~ 2GB | AT $(A_L)$ | Error |

Figure 7:
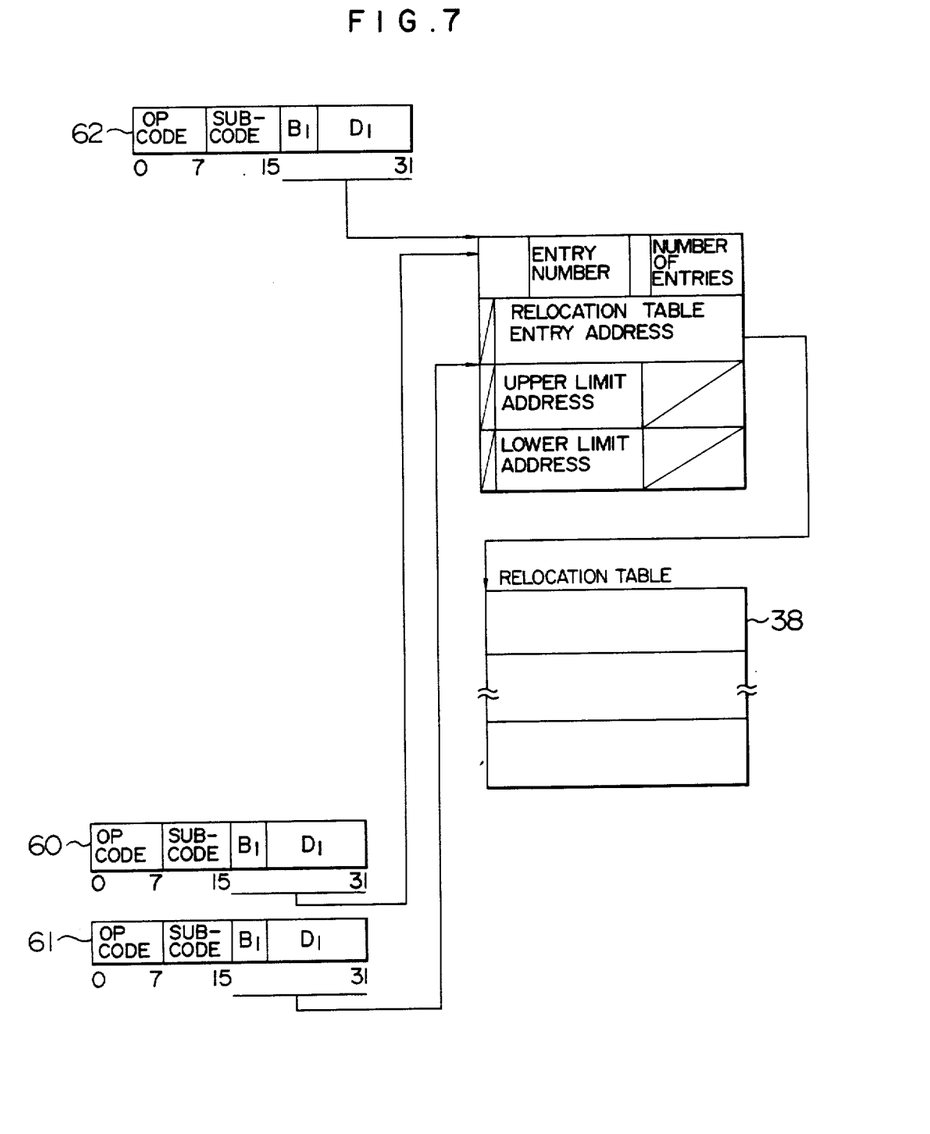
FIG. 7.is a diagram showing an example of instructions used in the address relocation of the present invention.

FIG. 7 shows scalar instructions for setting at respective registers information necessary for the range registers, relocation table entries and the like. Instructions 60 and 61 of FIG. 7 assume the logical address space allocation of FIG. 2. At the system set-up, the instruction 61 sets the upper/lower limit of the relocation range. At the start of each engineering and scientific computing job, the instruction 60 sets the corresponding relocation addresses. The instruction 60 is executed only once at the start of the job, and the contents of the relocation table are used until the end of the job. Instruction 60 assumes the logical address space allocation of FIG. 3. At the start of an engineering and scientific computing job, the instruction 60 sets the relocation range and its contents at the same time. Also at a change of a task (a change of a job from a certain space to another space), the instruction 60 is executed to set the relocation range and its contents corresponding to the job to be carried out.

Figure 8:
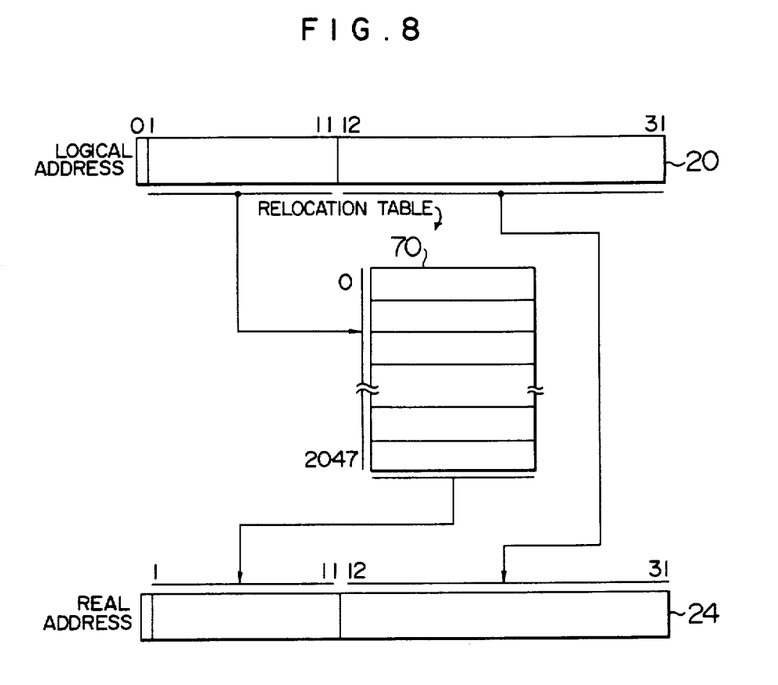
FIG. 8 is a block diagram showing a further embodiment of the address relocation system in the vector processor according to the present invention.

FIG. 8 shows another example of the address relocation system wherein the relocation ranges of FIGS. 5 and 6 are expanded to 2 GB which is the same with the scalar processor, and the range registers indicating the relocation range are omitted. The bits 1 to 11 of the logical address 20 read an entry of the relocation table 70, which entry is set at the bits 1 to 11 of the real address. The bits 12 to 31 of the logical address 20 are directly set at the bits 12 to 31 of the real address. Also in this embodiment, the unit of relocation is set as 1 MB which differs from 4 KB of the scalar processor. As shown in FIG. 8, the relocation table 70 is constructed of 2048 entries.

While particular embodiments of the invention have been shown and described, it will be obvious to those skilled in the art that various changes and modifications may be made without departing from the present invention in its broadest aspect.

We claim:

1. An information processing apparatus including a main storage means connected to a plurality of processors performing address identification by translating a logical address into a real address for data processing, said plurality of processors comprising:
   a first processor including a translation look-aside buffer for storing a portion of an address translation table, which is disposed in said main storage means; for translating a logical address into a real address; and
   a second processor including at least one relocation table; an address relocation means for address-relocating a logical address based on information contained in said at least one relocation table; means for determining if said logical addres is present within a first predetermined logical address range to be relocated; and address forming means responsive to an output from said determining means for outputting a real address which is a relocated address of said logical address by using said address relocation means when said logical address is determined to be within said first predetermined logical address range, and for outputting a real address which is said logical address when said logical address is determined to be outside of said first predetermined logical address range; wherein the content of said at least one relocation table and said first predetermined address range are set by said at least one first processor.

2. An information processing apparatus according to claim 1, wherein said second processor includes a plurality of relocation tables, in which the content of each relocatin table is set in correspondence with each of different programs respectively, and further includes means for selecting one of said plurality of relocation tables for performing address relocation in accordance with one of said different programs to be executed.

3. An information processing apparatus according to claim 1, wherein said second processor further includes error detection means for detecting if said real address outputted from said address forming means lies within a predetermined real address range and for outputting and error signal if said real address does not lie within said predetermined real address range.

4. An information processing apparatus according to claim 3, wherein said second processor includes an address range detection means for detecting if said logical address lies within a second predetermined logical address range, and wherein said address forming means receives an output from said determining means and an output from said address range detection means, and includes means responsive to a logical address being determined to lie outside of said first predetermined logical address range, for outputting said logical address as a real address when said logical address lies within said second predetermined logical address range and outputs an error signal when said logical address lies outside of said second predetermined logical address range.

* * * * *